April 24, 1928.

C. R. McLAUGHLIN 1,667,668

APPARATUS FOR MANUFACTURING MATCHED FLOORING

Filed July 16, 1926

WITNESSES
H. A. LaClair

INVENTOR
C. R. McLaughlin
BY
ATTORNEYS

Patented Apr. 24, 1928.

1,667,668

UNITED STATES PATENT OFFICE.

CLARKE R. McLAUGHLIN, OF LONGVILLE, LOUISIANA.

APPARATUS FOR MANUFACTURING MATCHED FLOORING.

Application filed July 16, 1926. Serial No. 122,988.

My present invention relates generally to what is commonly known as side and end matched flooring, that is flooring, generally hardwood, which is provided with tongues and grooves along both the sides and ends thereof.

Ordinarily such apparatus includes a side matcher through which the flooring strips pass, and in which they are provided with a tongue along one side and a groove along the other side. The strips then move to a conveyor by which they are carried to an end matcher, which grooves one end, and in this operation the strips are shifted across a table from the first conveyor to a second parallel return conveyor upon which they are carried to a second end matcher wherein the other ends of the strips are formed with tongues.

In the course of the passage of the side matched strips along the first mentioned conveyor, these strips pass saw tables, on which saws are mounted, and at this station operators remove such strips as show knots or imperfections and remove the same by sawing them out of the strips. For this purpose the strips are cut into various lengths which are subsequently replaced upon the first mentioned conveyor to be carried thereby to the first end matcher. With the present arrangement as thus outlined, the single conveyor between the side and the end matchers, permits of the use of but two saws at the saw tables, and the entire operation is necessarily somewhat slow on this account.

The primary object of my invention is to permit of speeding up the operation, and to this end I propose the utilization of two conveyors between the side and end matchers disposed in vertically spaced overlapping relation at least in part, and I arrange the saw tables between and along such over-lapping portions, so that the side matched strips may be removed from the upper conveyor, sawed, and dropped upon the lower conveyor for movement upon the latter, to the end matchers. This arrangement permits of the use of as many saws at the saw tables as may be needed and results in greatly speeding up the operation as a whole.

In the accompanying drawing which illustrates my present invention and forms a part thereof:—

Figure 1:
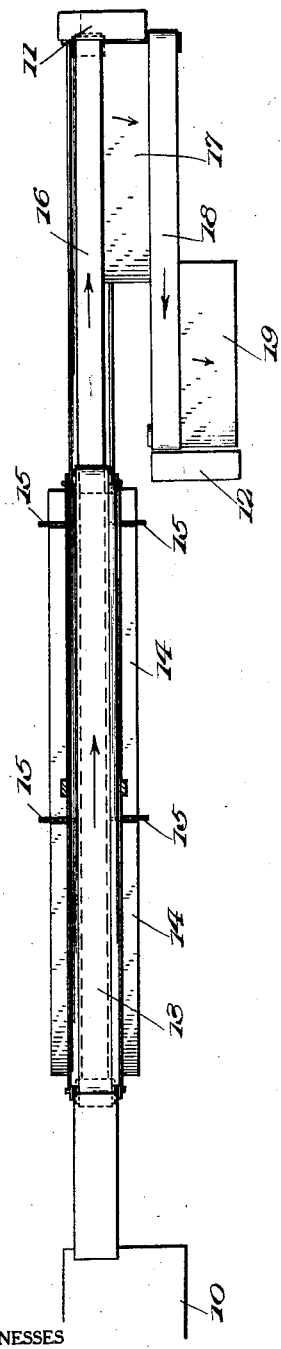
Figure 2:
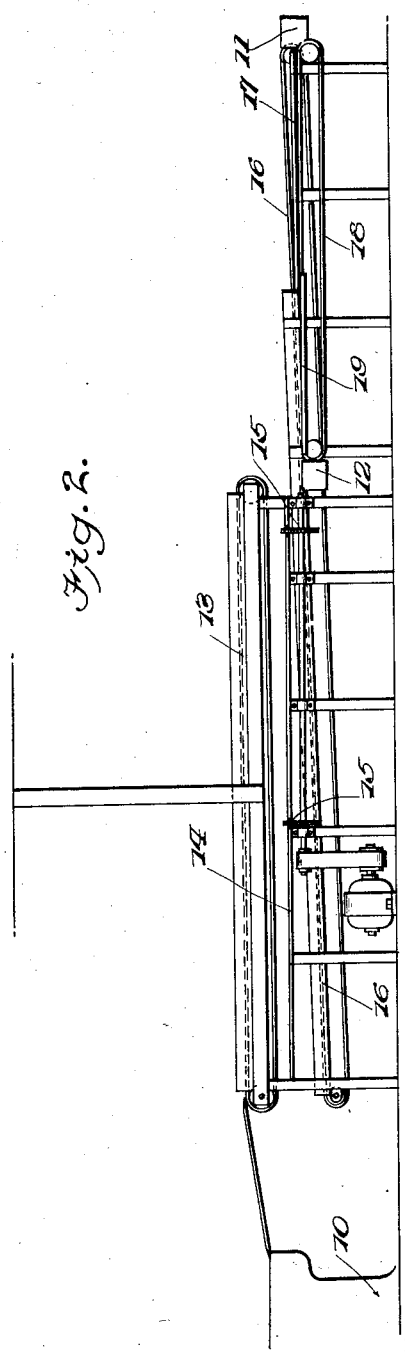

Figure 1 is a top plan view showing the apparatus in more or less diagrammatic form as proposed by my invention, and, Figure 2 is a side view thereof.

Referring now to these figures, I have shown in both figures a side matcher 10, and end matchers 11 and 12, in a wholly diagrammatic manner, inasmuch as the details of these machines form no part of my present invention and they exist simply as parts of well known construction in the apparatus utilized as a whole for the manufacture of matched flooring. It is sufficient to point out that in the side matcher 10 to which the planed strips are fed in the first instance, these strips are provided along one side with a groove and along the other side with a tongue. From the side matcher 10 the strips pass to an endless conveyor 13, which in accordance with my invention is elevated some distance above the floor or other supporting surface and extended for the full length of the saw tables 14, supported below and along the conveyor 13 and provided with any suitable number of saws 15, as may be found necessary.

The conveyor 13 is moreover spaced vertically above the lower or receiving end of a conveyor 16 which receiving end of conveyor 16 is also located below the saw tables 14 to receive the cut sections of the flooring strips after they have been operated upon by the saws 15 to remove knots and other imperfections. The conveyor 16 leads beyond the outer end of the conveyor 13 and to the first end matcher 11 where, in the movement of one end of the strip for the formation of a groove along such end, the strip is shifted laterally from the conveyor 16 over a table 17 to a return conveyor 18 parallelling a portion of the conveyor 16. Upon the conveyor 18 the strips are shifted lengthwise in the opposite direction in order to move their other ends into an end matcher 12 where during the lateral shifting movement of the strips across a table 19, the last mentioned ends of the strips are formed with tongues complementary to the grooves formed by the end matcher 11.

By thus providing two conveyors between the side and end matchers, with overlapping portions in vertically spaced relation above and below, as well as along the saw tables, I overcome the disadvantages of the usual apparatus first above mentioned and provide for the use of as many saws as may be needed to speed up the operation and bring about maximum output.

I claim:—

1. In an apparatus for the manufacture of matched flooring of the type described, including side and end matchers between which the flooring strips are conveyed and saw tables between the side and end matchers having saws for the removal of knots and imperfections, a conveyor for receiving flooring strips from the side matcher and extending above the saw tables, and a second conveyor leading to the end matchers and having a portion thereof arranged beneath the saw tables and vertically spaced below the first mentioned conveyor.

2. In an apparatus for the manufacture of flooring of the type described including spaced apart side and end matchers and saw tables having saws located between the side and end matchers, a conveying mechanism comprising a conveyor for conveying strips from the side matcher to the saw tables, and a second conveyor for conveying strips from the saw tables to the end matchers, said conveyors extending along the saw tables in vertically spaced relation and respectively located above and below the saw tables and in overlapped relation, for the purpose set forth.

CLARKE R. McLAUGHLIN.